(12) United States Patent  (10) Patent No.: US 9,154,920 B2
O'Brien et al.  (45) Date of Patent: Oct. 6, 2015

(54) SYSTEM AND METHOD FOR DETECTING A LOCATION OF A WIRELESS DEVICE (71) Applicant: LEAR CORPORATION, Southfield, MI (US)

(72) Inventors: Thomas O'Brien, Troy, MI (US); Hilton W. Girard, III, West Bloomfield, MI (US); Jason Bauman, Huntington Woods, MI (US); Jian Ye, Troy, MI (US)

(73) Assignee: Lear Corporation, Southfield, MI (US)

( * ) Notice: Subject to any disclaimer, the term of this patent is extended or adjusted under 35 U.S.C. 154(b) by 425 days.

(21) Appl. No.: 13/782,361

(22) Filed: Mar. 1, 2013

(65) Prior Publication Data

US 2014/0248898 A1 Sep. 4, 2014

(51) Int. Cl.
H04W 24/00 (2009.01)
H04W 4/04 (2009.01)

(52) U.S. Cl.
CPC .................................... *H04W 4/046* (2013.01)

(58) Field of Classification Search
None
See application file for complete search history.

(56) References Cited

U.S. PATENT DOCUMENTS

| | | | |
|---|---|---|---|
| 5,359,521 A * | 10/1994 | Kyrtsos et al. | 701/470 |
| 6,385,542 B1 | 5/2002 | Millington | |
| 2004/0021569 A1 | 2/2004 | Lepkofker et al. | |
| 2005/0197769 A1 | 9/2005 | Soehren et al. | |
| 2007/0090965 A1 | 4/2007 | McCall | |
| 2007/0222746 A1 | 9/2007 | LeVine | |
| 2010/0033298 A1 | 2/2010 | Kaihori et al. | |
| 2010/0076622 A1 | 3/2010 | Dickerhoof et al. | |
| 2010/0097239 A1 | 4/2010 | Campbell et al. | |
| 2010/0171642 A1 | 7/2010 | Hassan et al. | |
| 2011/0109447 A1 | 5/2011 | Saguchi | |
| 2011/0218709 A1 | 9/2011 | Hermann | |
| 2011/0257973 A1 | 10/2011 | Chutorash et al. | |
| 2012/0130632 A1 | 5/2012 | Bandyopadhyay et al. | |
| 2012/0218128 A1 | 8/2012 | Tieman et al. | |

(Continued)

FOREIGN PATENT DOCUMENTS

| | | | |
|---|---|---|---|
| DE | 10 2010 063 702 A1 | 6/2010 | |
| GB | 2498837 A | 7/2013 | |
| GB | 2505287 A | 2/2014 | |

OTHER PUBLICATIONS

GB Search and Examination Report dated Jun. 6, 2014 for GB1319359.4.

(Continued)

*Primary Examiner* — Pakee Fang
*Assistant Examiner* — Keith Fang
(74) *Attorney, Agent, or Firm* — Brooks Kushman P.C.

(57) ABSTRACT

A vehicle system and method is provided for detecting the location of a portable wireless device. The vehicle system includes the portable device and a plurality of base stations positioned about a vehicle. The portable device is configured to transmit a first wireless signal and a second wireless signal indicative of motion data of the portable device. A main base station of the plurality of base stations is configured to determine a first final position of the portable device in response to each of the plurality of base stations successfully receiving the first wireless signal. The main base station is further configured to determine a second final position of the portable device using the first final position and the motion data of the second wireless signal as received at the first base station and after determining that the second base station has not successfully received the second wireless signal.

20 Claims, 5 Drawing Sheets

(56) References Cited

U.S. PATENT DOCUMENTS

| | | |
|---|---|---|
| 2012/0239248 A1 | 9/2012 | Bobbitt |
| 2012/0262340 A1 | 10/2012 | Hassan et al. |
| 2012/0282906 A1* | 11/2012 | Frye et al. .................. 455/414.2 |
| 2013/0314104 A1* | 11/2013 | Lammel et al. ............... 324/629 |
| 2014/0099899 A1* | 4/2014 | Jamal-Syed et al. ......... 455/41.2 |
| 2014/0149145 A1* | 5/2014 | Peng et al. ........................ 705/4 |

OTHER PUBLICATIONS

DE Office Action dated Jul. 22, 2014 for DE102013225600.0.

* cited by examiner

SYSTEM AND METHOD FOR DETECTING A LOCATION OF A WIRELESS DEVICE

TECHNICAL FIELD

One or more embodiments relate to a vehicle system and method for determining a present location of a wireless device about a vehicle based on a previously detected location.

BACKGROUND

U.S. Patent Publication No. 2010/0076622 to Dickerhoof et al. discloses a system for determining the location of a wireless device with respect to a vehicle. The system comprises a plurality of antennas positioned about the vehicle for receiving a wireless signal from the wireless device. The wireless signal corresponds to at least one of a command and status related to a predetermined vehicle operation. The system further comprises a controller operably coupled to each antenna. The controller is configured to generate a location signal indicative of the location of the wireless device based on the time of flight of the wireless signal at one or more antennas of the plurality of antennas and to control the operation of the predetermined vehicle operation based on the location signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform any number of the operation(s) as disclosed herein.

Figure 1:
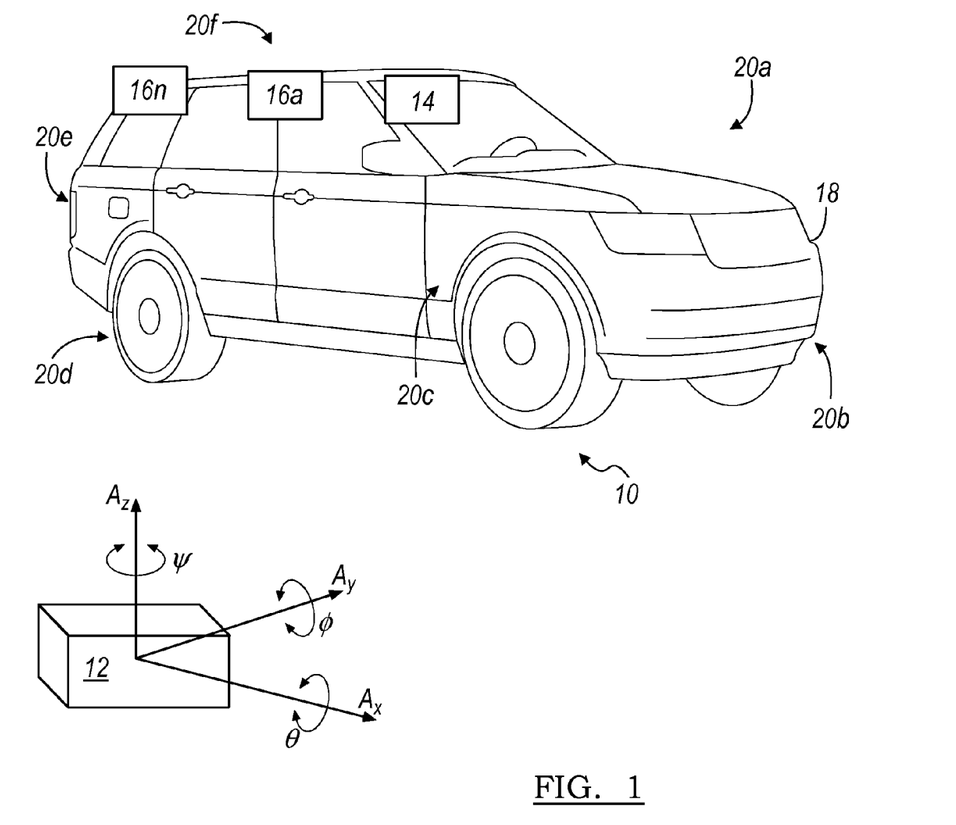
FIG. 1 depicts a vehicle system for detecting a location of a wireless device according to one embodiment.

Referring to FIG. 1, a vehicle system for determining a location of a wireless device is illustrated in accordance with one or more embodiments and is generally referenced by numeral 10. The vehicle system 10 includes a wireless device 12 and at least three nodes, including a main base station 14 and at least two auxiliary base stations 16a-16n ("16"). The vehicle system 10 detects the location of the wireless device 12 relative to a vehicle 18. For example, the main base station 14 and the auxiliary base stations 16 each include a transmitter/receiver ("transceiver") for wirelessly transmitting/receiving signals to/from the wireless device 12. The vehicle system 10 determines a present position of the wireless device 12 based on a previously determined initial position, when communication between the wireless device 12 and the nodes 14, 16 has been at least partially interrupted.

The vehicle system 10 determines the present position using either a dead reckoning technique or an adaptive predictability estimation. Dead reckoning is the process of calculating a present position by using a previously determined position, and advancing that position based upon estimated speeds over elapsed time, and course. Adaptive predictability estimation refers to a process of using known data (such as the speed, acceleration, orientation, initial position, and present position of the wireless device 12) to analyze the likelihood that the present position data is correct. This information can be used to filter, bias, reject, or ignore the present position.

The wireless device 12 may be implemented as a key fob or other suitable device that is used to gain entry into the vehicle 18.

The main base station 14 generally includes additional circuitry to lock and unlock the vehicle 18 in response to command signals as provided by the wireless device 12. The vehicle system 10 performs a passive entry passive start (PEPS) function in which the main base station 14 unlocks the vehicle 18 in response to determining that the wireless device 12 is positioned in a corresponding zone 20a-20n ("20") about the vehicle. For example, the illustrated embodiment depicts a front driver side zone 20a, a vehicle front zone 20b, a front passenger side zone 20c, a rear passenger side zone 20d, a vehicle rear zone 20e, and a rear driver side zone 20f. The zones 20 generally correspond to predetermined authorized locations about the vehicle 18 (e.g., interior to and exterior to the vehicle 18) such that if the wireless device 12 is detected to be in one of such zones 20, then the main base station 14 may automatically unlock the vehicle (or door) proximate to the zone 20 in which the wireless device 12 is detected to be within and enable the user to start the vehicle.

The vehicle system 10 utilizes remote keyless operation in addition to the PEPS function, according to one or more embodiments. For example, the main base station 14 may perform a desired operation (e.g., lock, unlock, lift gate release, remote start, etc.) with the vehicle 18 in the event the wireless device 12 transmits a command indicative of the desired operation while within the authorized zone 20.

The main base station 14, the auxiliary base stations 16, and the wireless device 12 engage in a series of signal exchanges with one another and utilize a time of flight (TOF) implementation to determine a distance of the wireless device 12 from the vehicle 18. Thereafter, the main base station 14 and the auxiliary base stations 16 employ trilateration to locate the actual zone 20 that the wireless device 12 is positioned within. The use of trilateration enables the main base station 14 the ability to locate where the wireless device 12 is positioned horizontally from the vehicle. This information (e.g., which zone 20 the wireless device 12 is positioned within) coupled with distance information as ascertained by utilizing TOF enables the main base station 14 to locate with increased levels of accuracy the location of the wireless device 12 in relation to the vehicle 18. The vehicle system 10 may be arranged to precisely determine the location of the wireless device 12 about or within the vehicle 18 as opposed to conventional systems in which perhaps only the transponder may be located at various sides of the vehicle with lesser degrees of accuracy. In other embodiments, the main base station 14, the auxiliary base stations 16, and the wireless device 12 determine a distance of the wireless device 12 from the vehicle 18 based on the arrival time of one or more wireless signals.

Figure 3:
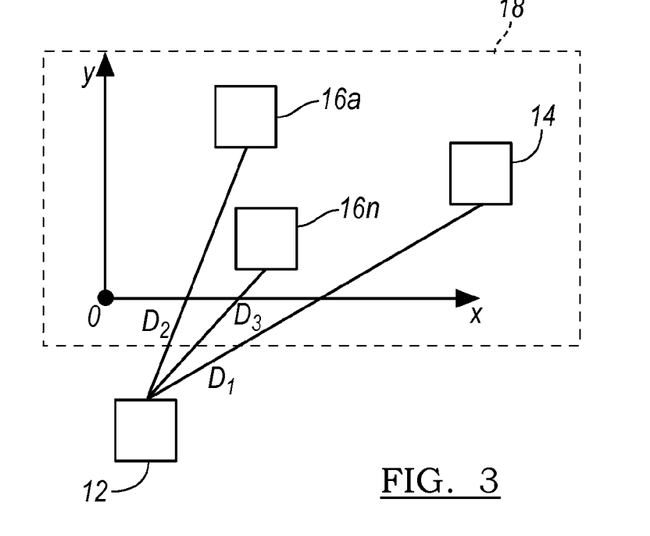
FIG. 3 depicts a first distance, a second distance, and a third distance of the wireless device from the vehicle according to one embodiment.

For example, the main base station 14 may determine that the wireless device 12 is positioned at a distance of three meters away from the vehicle 18 and that the wireless device 12 is positioned in the driver side zone 20a. While it is noted that the location of the wireless device 12 may be ascertained via the TOF and trilateration, it is recognized that the aspects noted herein with respect to locating the wireless device 12 may be applicable to other vehicle functions such as, but not limited to, tire pressure monitoring. While utilizing the TOF, it is recognized that the main base station 14 and the auxiliary base stations 16 may be positioned at predetermined locations in the vehicle 18 for transmitting and receiving signals to and from the wireless device 12. In one or more embodiments the nodes 14, 16 are located within a vehicle headliner (as shown in FIG. 1) and oriented in a generally triangular configuration (as shown in FIG. 3).

Figure 2:
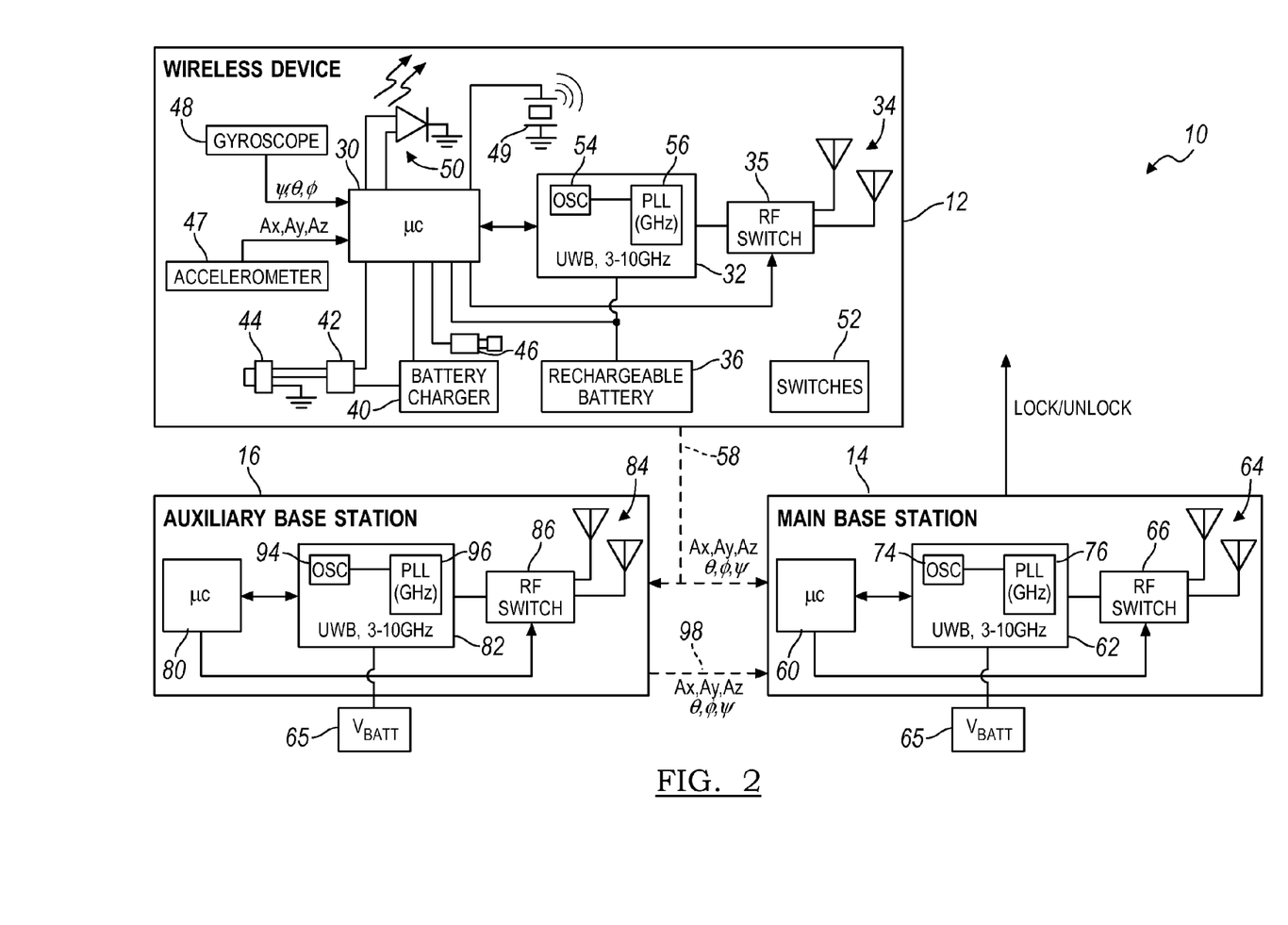
FIG. 2 depicts a detailed schematic view of the wireless device, a main base station and an auxiliary base station according to one embodiment.

FIG. 2 depicts a detailed schematic view of the wireless device 12, the main base station 14, and the auxiliary base station(s) 16 in accordance with one or more embodiments. The wireless device 12 includes a microcontroller 30, a transmitter/receiver ("transceiver") 32, and at least one antenna 34. The microcontroller 30 is operably coupled to the transceiver 32 and the antenna 34 for transmitting and receiving signals to/from the main base station 14 and the auxiliary base stations 16. A radio frequency (RF) switch 35 is operably coupled to the antennas 34 for coupling the same to the transceiver 32. A multiple antenna 34 implementation may provide for antenna diversity which may aid with respect to radio frequency multi-paths. The use of the RF switch 35 and multiple antennas are optional. For example, a single antenna 34 may be used for transmitting and receiving signal to and from the wireless device 12.

A rechargeable battery 36 powers the microcontroller 30 and the transceiver 32. A battery charger circuit 40 receives power from a charger connector 42 that is operably coupled to an external power supply (not shown). The battery charger circuit 40 may condition the incoming power from the external power supply to ensure that it is suitable for storage on the rechargeable battery 36. It is recognized that the battery charger circuit 40 and the battery 36 may wirelessly receive power from an external device (e.g., by inductive charging) for charging the same.

The battery charger 40 may indicate to the microcontroller 30 when the battery 36 is being recharged and/or the state of charge of the battery 36. A first lighting indicator 44 is positioned about the charger connector 42 and is operably coupled to the microcontroller 30 to provide charge status of the battery 36 to a user. A vibrating motor 46 is operably coupled to the microcontroller 30 and is arranged to provide haptic feedback to the user.

An accelerometer 47 is operably coupled to the microcontroller 30 for detecting the motion of the wireless device 12. The accelerometer 47 is configured to provide output that is indicative of acceleration in three axes (x, y, z) of the wireless device 12. For example, the accelerometer 47 may provide output that is indicative of a longitudinal acceleration ($A_x$), a lateral acceleration ($A_y$) and a vertical acceleration ($A_z$) of the wireless device 12. Other embodiments of the wireless device 12 include a two axis accelerometer 47. In one or more embodiments, the accelerometer 47 is an inertial device, such as an inertial micro-electro-mechanical system (MEMs) sensor. The wireless device 12 may be arranged to initiate the transmission of data in response to determining that it is moving based on the accelerometer output ($A_x$, $A_y$, and $A_z$). Such an approach helps conserve power with the battery 36.

The wireless device 12 also includes a gyroscope 48 for detecting the motion of the wireless device 12 according to one or more embodiments. The gyroscope 48 is operably coupled to the microcontroller 30, and configured to provide orientation data that is indicative of a yaw rate ($\Psi$), a pitch rate ($\theta$), and a roll rate ($\phi$) of the wireless device 12, as shown in FIG. 1. The pitch rate ($\theta$) represents an angular rate of change about the longitudinal (x) axis. The roll rate ($\phi$) represents an angular rate of change about the lateral (y) axis, and the yaw rate ($\Psi$) represents an angular rate of change about the vertical (z) axis. The gyroscope data is used to remove the effects of gravity and to orient the wireless device 12. In one or more embodiments, the gyroscope 48 is a MEMs device, such as an inertial MEMs sensor.

A piezo-sounder 49 is also operably coupled to the microcontroller 30 and is arranged to provide an audio based feedback. A second lighting indicator 50 is operably coupled to the microcontroller 30 and is arranged to provide a visual feedback. A plurality of switches 52 are positioned on the wireless device 12 for transmitting commands to the vehicle 18 for initiating a number of vehicle operations (e.g., door lock and unlock, lift gate release, remote start, etc.).

The transceiver 32 is generally configured to operate at a frequency of between 3 and 10 GHz and communicate within an ultra-wide band (UWB) bandwidth of at least 500 MHz. Such high frequency communication in the UWB bandwidth enables the vehicle system 10 to determine a distance of the wireless device 12 with respect to the vehicle within a high degree of accuracy. The transceiver 32 generally includes an oscillator 54 and a phase locked loop (PLL) 56 for enabling the transceiver 32 to operate at the frequency of between 3 and 10 GHz.

The microcontroller 30 is operably coupled to the transceiver 32 and the antenna 34 for transmitting a wireless signal 58 to the main base station 14 and the auxiliary base stations 16. The wireless signal 58 includes the acceleration data ($A_x$, $A_y$, and $A_z$). The wireless signal 58 also includes the gyroscope data ($\Psi$, $\theta$, and $\phi$) according to one or more embodiments.

The main base station 14 generally includes a microcontroller 60, a transceiver 62, and at least one antenna 64. A power source 65 in the vehicle 18 powers the microcontroller 60 and the transceiver 62. An RF switch 66 is operably coupled to the microcontroller 60 and to the antenna 64. The RF switch 66 is operably coupled to the antennas 64 for coupling the same to the transceiver 62. A multiple antenna 64 implementation may provide for antenna diversity which may aid with respect to RF multi-paths. It is also contemplated that a single antenna 64 may be used for transmitting and receiving signal to and from the wireless device 12 without the need for the RF switch 66. The microcontroller 60 is operably coupled to the transceiver 62 and the antenna 64 for transmitting and receiving signals to/from the wireless device 12 (e.g., the wireless signal 58) and the auxiliary base station 16. The microcontroller 60 determines the position of the wireless device 12 based on these signals. The main base station 14 further includes circuitry (not shown) for performing locking/unlocking of vehicle doors and/or a liftgate/trunk and for performing remote start operation.

The transceiver 62 is also generally configured to operate at a frequency of between 3 and 10 GHz and communicate within an ultra-wide band (UWB) bandwidth of at least 500 MHz. Operating the transceiver 62 at an operating frequency of between 3 and 10 GHz and within the UWB bandwidth may enable the main base station 14 to determine the distance of the wireless device 12 with respect to the vehicle within a high degree of accuracy when it engages in communication with the wireless device 12. The transceiver 62 generally includes an oscillator 74 and a PLL 76 for enabling the transceiver 62 to operate at the frequency of between 3 and 10 GHz.

The auxiliary base station 16 generally includes a microcontroller 80, a transceiver 82, and at least one antenna 84. An RF switch 86 is operably coupled to the microcontroller 80 and to the antenna 84. The RF switch 86 and the multi-antenna 84 implementation are optional for the reasons noted above. The microcontroller 80 is operably coupled to the transceiver 82 and the antenna 84 for transmitting and receiving signals to/from the wireless device 12 (e.g. the wireless signal 58) and the main base station 14. The power source 65 in the vehicle 18 powers the microcontroller 80 and the transceiver 82.

The transceiver 82 is also generally configured to operate at a frequency of between 3 and 10 GHz and communicate within an ultra-wide band (UWB) bandwidth of at least 500 MHz. Operating the transceiver 82 at an operating frequency of between 3 and 10 GHz enables the vehicle system 10 to determine the distance of the wireless device 12 with respect to the vehicle within a high degree of accuracy when it engages in communication with the wireless device 12. The transceiver 82 generally includes an oscillator 94 and a PLL 96 for enabling the transceiver 82 to operate at the frequency of between 3 and 10 GHz. It is recognized that the second auxiliary base station 16n (shown in FIG. 1) is similar to the auxiliary base station 16 as described above and includes similar components and provides similar functionality.

Each auxiliary base station 16 receives the wireless signal 58 from the wireless device 12, and transmits a message 98 to the main base station 14 that includes information that is indicative of the time of flight of the wireless signal and the acceleration data ($A_x$, $A_y$, and $A_z$). The message 98 also includes the gyroscope data ($\Psi$, $\theta$, and $\phi$) according to one or more embodiments. The main base station 14 also receives the wireless signal 58 and generates a message (not shown) that includes information that is indicative of the time of flight of the wireless signal 58 along with the acceleration and gyroscope data.

The wireless device 12, the main base station 14, and the auxiliary base stations 16 are each arranged to transmit and receive data within the UWB bandwidth of at least 500 MHz, this aspect may place large current consumption requirements on such devices. For example, by operating in the UWB bandwidth range, such a condition yields a large frequency spectrum (e.g., both low frequencies as well as high frequencies) and a high time resolution which improves ranging accuracy. Power consumption may not be an issue for the main base station 14 and the auxiliary base station 16 since such devices are powered from the power source 65 in the vehicle. However, this may be an issue for the wireless device 12 since it is a portable device. Generally, portable devices are equipped with a standalone battery. In the event the standalone battery is implemented in connection with the wireless device 12 that transmits/receives data in the UWB bandwidth range, the battery may be depleted rather quickly. To account for this condition, the wireless device 12 includes the rechargeable battery 36 and the battery charger circuit 40, along with the charger connector 42 (or wireless implementation) such that the battery 36 can be recharged as needed to support the power demands used in connection with transmitting/receiving information in the UWB bandwidth range.

In general, the higher the operating frequency of the transceivers 32, 62, and 82; the larger the bandwidth that such transceivers 32, 62, and 82 can transmit and receive information. Such a large bandwidth (i.e., in the UWB bandwidth) may improve noise immunity and improve signal propagation. This may also improve the accuracy in determining the distance of the wireless device 12 since UWB bandwidth allows a more reliable signal transmission. As noted above, an operating frequency of 3-10 GHz enables the transceivers 32, 62, and 82 to transmit and receive data in the UWB range. The utilization of the UWB bandwidth for the wireless device 12, the main base station 14, and the auxiliary base stations 16 may provide for (i) the penetration of the transmitted signals to be received through obstacles (e.g., improved noise immunity), (ii) high ranging (or positioning) accuracy, (iii) high-speed data communications, and (iv) a low cost implementation. Due to the plurality of frequency components in the UWB spectrum, transmitted data may be received at the wireless device 12, the main base station 14, and the auxiliary base station 16 more reliably when compared to data that is transmitted in connection with a narrow band implementation (e.g., carrier frequency based transmission at 315 MHz, etc.). For example, UWB based signals may have both good reflection and transmission properties due to the plurality of frequency components associated therewith. Some of the frequency components may transmit through various objects while others may reflect well off of objects. These conditions may increase the reliability in the overall reception of data at the wireless device 12, the main base station 14, and the auxiliary base stations 16. Further, transmission in the UWB spectrum may provide for robust wireless performance against jamming. This may also provide for an anti-relay attack countermeasure and the proper resolution to measure within, for example, a few centimeters of resolution. The implementation of UWB in the wireless device 12, the main base station 14, and the auxiliary base station 16 is generally suitable for TOF applications.

Referring to FIG. 3, the vehicle system 10 determines a distance between the wireless device 12 and each node (main base station 14 and auxiliary base stations 16) using TOF. The vehicle system 10 then determines which zone 20 (shown in FIG. 1) the wireless device 12 is presently located in using trilateration. Such methods are disclosed in U.S. Ser. No. 13/675642 to Ghabra et al., which is incorporated by reference in its entirety herein.

Each node 14, 16 receives the wireless signal 58 from the wireless device 12 and generates a message having information that is indicative of the time of flight of the wireless signal 58. The main base station 14 receives the time of flight information from each node 14, 16 and engages in TOF measurements to determine a first distance (D1) between the wireless device 12 and the main base station 14, a second distance (D2) between the wireless device 12 and the first auxiliary base station 16a, and a third distance (D3) between the wireless device 12 and the second auxiliary base station 16n. At least three distance readings are needed such that trilateration is performed with the same to determine the zone 20 in which the wireless device 12 is located in. It is also contemplated that the wireless device 12 may provide its own distance with respect to the vehicle 18 using TOF measurements with the main base station 14 or the auxiliary base station 16.

The vehicle system 10 determines a present location of the wireless device 12 using the distance (D1, D2, D3) and the zone 20 information. However, if the communication between the wireless device 12 and at least one of the nodes 14, 16 is disrupted, or partially disrupted, then the vehicle system 10 estimates the present location of the wireless device 12 using dead reckoning or an adaptive predictability estimation.

Once communication is disrupted, the vehicle system 10 determines a present location of the wireless device 12 based on an initial distance vector, and information provided by the accelerometer and gyroscope (shown in FIG. 2). Such an initial distance vector is determined using the TOF and trilateration techniques described with reference to FIG. 3, using information provided before the communication was disrupted.

Figure 4:
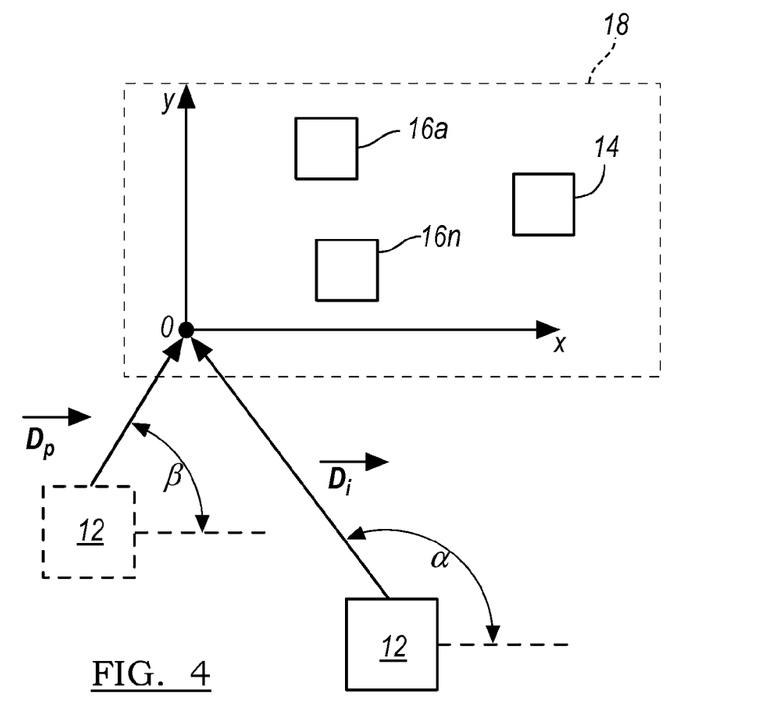
FIG. 4 depicts an initial distance vector between the wireless device oriented at an initial position and the vehicle, and a present distance vector between the wireless device oriented at a present position and the vehicle.

With reference to FIG. 4, the vehicle system 10 determines the initial distance vector ($\vec{D}_i$) corresponding to a distance ($D_i$) and an angle ($\alpha$) between the wireless device 12, when oriented at an initial position, and a predetermined location of the vehicle 18 (e.g., point O in FIG. 4). The initial distance vector ($\vec{D}_i$) is based on the on the distances (D1, D2, D3) between the wireless device 12 and the nodes 14, 16 and the zone 20 that the device 12 is located within. The magnitude, or distance ($D_i$) of the initial distance vector ($\vec{D}_i$) may be calculated using equation 1 as shown below:

$$D_i = \sqrt{D1^2 + D2^2 + D3^2} \qquad \text{Eq. 1}$$

The angle ($\alpha$) between the wireless device 12 and a predetermined location of the vehicle 18 (e.g. point O) may be calculated using a trigonometric equation that depends on which zone the wireless device 12 is located within.

The vehicle system 10 also determines a present distance vector ($\vec{D}_p$) corresponding to a distance ($D_p$) and angle ($\beta$) between the wireless device 12, when oriented at a present position, and a predetermined location of the vehicle 18 (e.g., the point O). The determination of the present distance vector ($\vec{D}_p$) is described in more detail below.

Figure 5:
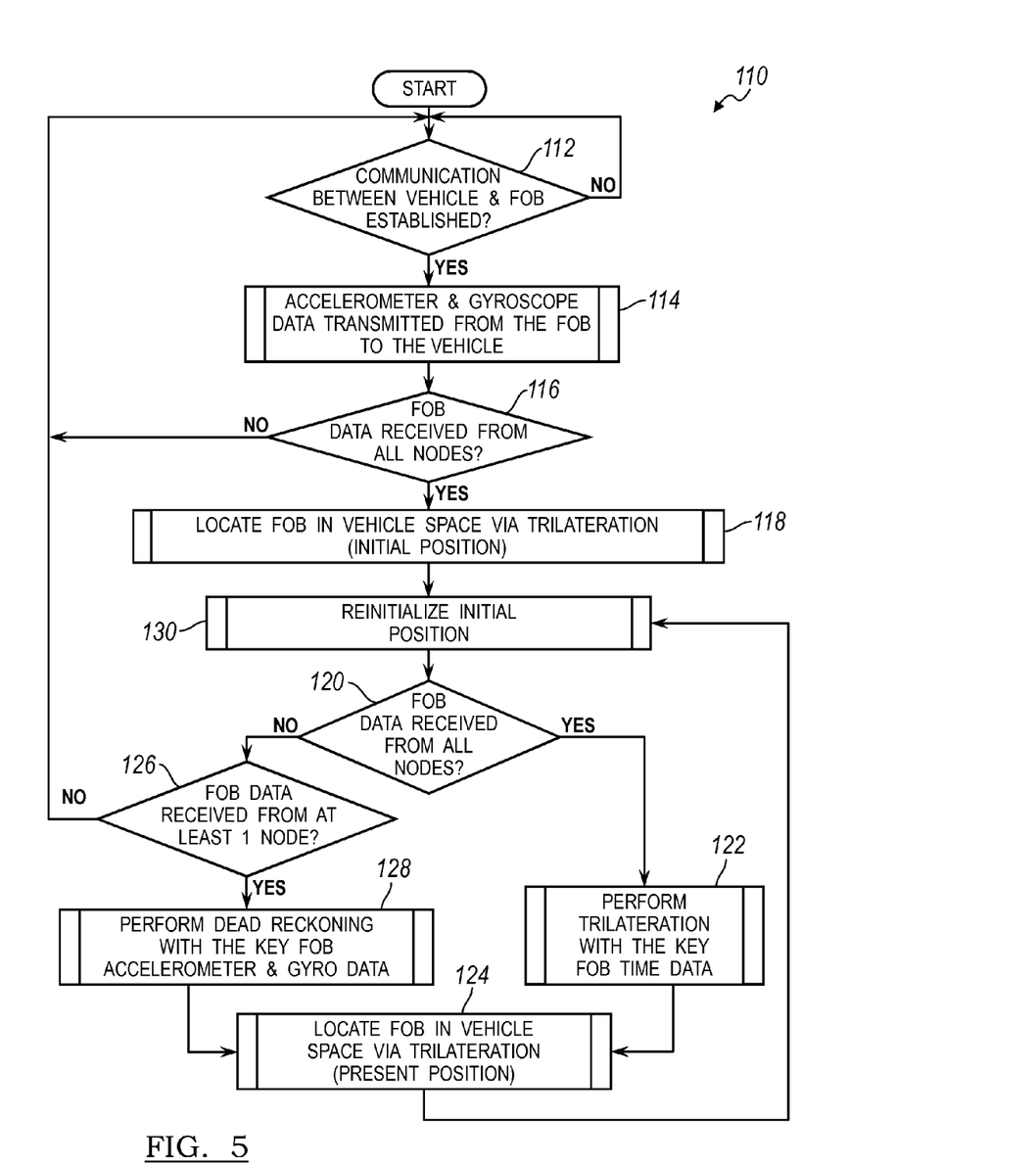
FIG. 5 depicts a method for determining the present location of the wireless device in accordance with one embodiment.

With reference to FIG. 5, a method for determining a present position of the wireless device based on a previously detected position using dead reckoning is illustrated in accordance with one or more embodiments and generally referenced by numeral 110. The method is implemented using software code contained within the microcontrollers 30, 60, 80 of the vehicle system 10, according to one or more embodiments.

At operation 112, the vehicle system 10 determines if communication between the wireless device and the vehicle nodes 14, 16 has been established. Operation 112 repeats until communication is established. At operation 114 each node 14, 16 receives information from the wireless device 12 including the acceleration and gyroscope data. Each node 14, 16 then generates a message that includes information that is indicative of the time of flight of the wireless signal 58, the acceleration data and the gyroscope data. At operation 116, the main base station 14 determines if the data from the wireless device 12 has been received by all vehicle nodes, including itself. If the determination at operation 116 is negative, indicating a partial disruption of communication between the wireless device 12 and the nodes 14, 16, then the vehicle system 10 returns to operation 112.

If the determination at operation 116 is positive, (i.e. all nodes 14, 16 received the wireless device data), then the vehicle system 10 proceeds to operation 118 and locates the wireless device 12 in vehicle space. Locating the wireless device 12 includes calculating the distances (D1, D2, D3) and determining the zone 20 that the wireless device 12 is located in using TOF and trilateration, and then calculating a first final position of the wireless device 12, such as the initial position ($D_i$), based on the distance and zone information.

At operation 120 the vehicle system 10 again determines if the data from the wireless device 12 has been received by all vehicle nodes, including itself. If the determination at operation 120 is positive (all nodes 14, 16 received the wireless device data) then the vehicle system 10 proceeds to operations 122 and 124 calculates a present position ($D_p$) of the wireless device 12 using TOF and trilateration.

If the determination at operation 120 is negative, the vehicle system 10 proceeds to operation 126. At operation 126 the vehicle system 10 determines if data from the wireless device 12 has been received by at least one vehicle node 14, 16. If such data is received, the vehicle system proceeds to operation 128 and estimates a second final position, such as the present position ($D_p$), of the wireless device 12 using dead reckoning.

As an initial step of the dead reckoning process, the vehicle system 10 uses the gyroscope data to remove the effects of gravity present in the acceleration data. Additionally, the accelerometer 47 and the gyroscope 48 are orientated with respect to a heading of the wireless device 12 relative to the vehicle 18. As depicted by operation 130, this orientation is reinitialized during each iteration of the present position determination, as this is the source of the absolute data.

The accelerometer information ($A_x$, $A_y$, and $A_z$) is biased due to the effects of gravity. Therefore the vehicle system compensates the acceleration information using the gyroscope information. As described above with reference to FIGS. 1 and 2, the pitch rate ($\theta$) represents an angular offset from the longitudinal (x) axis. The roll rate ($\phi$) represents an angular offset from the lateral (y) axis, and the yaw rate ($\Psi$) represents an angular offset from the vertical (z) axis. Therefore, the vehicle system filters the acceleration data using the corresponding gyroscope data. For example, the vehicle system 10 filters the longitudinal acceleration ($A_x$) using the pitch angle ($\theta$). Similarly, the lateral acceleration ($A_y$) is filtered using the roll angle ($\phi$), and the vertical acceleration ($A_z$) is filtered using the yaw rate ($\Psi$). Orienting the wireless device 12 allows for the data to be normalized back to a static vehicle home position (e.g., reference point O) and to only analyze the acceleration data in the desired planes (x, y, z).

This normalized data is then processed to determine a heading and a displacement (d1, d2, d3) between the wireless device 12 oriented at a previous position (e.g., the initial position) and the present position, by taking the first and second integral of the x and y axis accelerations. The vehicle system calculates the velocity ($V_x$, $V_y$, and $V_z$) of the wireless device in each direction (x, y, z) by integrating the corresponding filtered acceleration value. For example, the longitudinal velocity ($V_x$) may be calculated by integrating the filtered longitudinal acceleration ($A_{x\_filt}$) with respect to time. Similarly, the lateral velocity ($V_y$) is calculated by integrating the filtered lateral acceleration ($A_{y\_filt}$); and the vertical velocity ($V_z$) is calculated by integrating the filtered vertical acceleration ($A_{z\_filt}$).

The vehicle system calculates the displacement ($d_x$, $d_y$, and $d_z$) of the wireless device 12 in each direction (x, y, z) by taking the second integral of the corresponding filtered acceleration value. For example, the longitudinal displacement ($d_x$) may be calculated by taking the second integral of the filtered longitudinal acceleration ($A_{x\_filt}$) with respect to time. Similarly, the lateral displacement ($d_y$) is calculated by taking the second integral of the filtered lateral acceleration ($A_{y\_filt}$); and the vertical displacement ($d_z$) is calculated by taking the second integral of the filtered vertical acceleration ($A_{z\_filt}$).

The vehicle system estimates a present distance vector ($\vec{D}_p$) and a heading of the wireless device based on the displacement values ($d_x$, $d_y$, and $d_z$) using a Kalman filter. A Kalman filter is an algorithm that operates recursively on streams of noisy input data to provide a statistically optimal estimate of an underlying system state. Basically, the Kalman filter is an algorithm which uses a series of measurements that are observed over time and contain random variations (noise), and provides estimates of unknown variables that are more accurate than the measurements alone. A Kalman filter may be thought of as an approach to estimate the state of a "black box", based on measurable inputs and outputs. The Kalman filter is implemented using software code contained within the microcontroller 60 of the main base station 14, according to one or more embodiments The Kalman filter algorithm estimates a state using a two-step process including a time update prediction step, and a measurement update step. In the prediction step, the Kalman filter provides estimates of the current state variables, along with their uncertainties. The measurement update step is a form of feedback control. Once the Kalman filter observes the next measurement, the estimates are updated using a weighted average, where more weight is given to estimates with higher certainty. The weights are calculated from the covariance, which includes a measurement noise covariance (R) and a process noise covariance (Q). The covariance is a measure of the estimated uncertainty of the prediction of the system's state.

The measurement noise covariance (R) determines how much information from the current measurement is used. A high value for R indicates that the measurement is not very accurate. If R is high, then the Kalman filter will use less weight on the current measurement. If R is low, then the Kalman Filter will follow the measurements more closely. The process noise covariance (Q) greatly affects the Kalman Filter as well. With a high Q, then the Kalman filter tracks large changes more closely. However, the estimate becomes noisier as the estimate is allowed to "move" more in one time step.

The Kalman filter process is repeated every time step, where the new estimate and its covariance informs the prediction used in the following iteration. The Kalman filter is a recursive estimator. This means that only the estimated state from the previous time step and the current measurement are used to compute the estimate for the current state. Then the wireless device 12 can be placed in the vehicle space at its present position ($D_p$) with a heading, velocity and potential displacement relative to its velocity. After operation 124, the vehicle system returns to operation 120.

The gyroscope 48 is included as an optional feature for the vehicle system 10. The information provided by the gyroscope 48 is used to provide a more accurate determination of the location of the wireless device using dead reckoning. However, alternative embodiments of the vehicle system 10 are provided without the gyroscope 48, for applications having less stringent requirements for the determination of the position of the wireless device 12.

Figure 6:
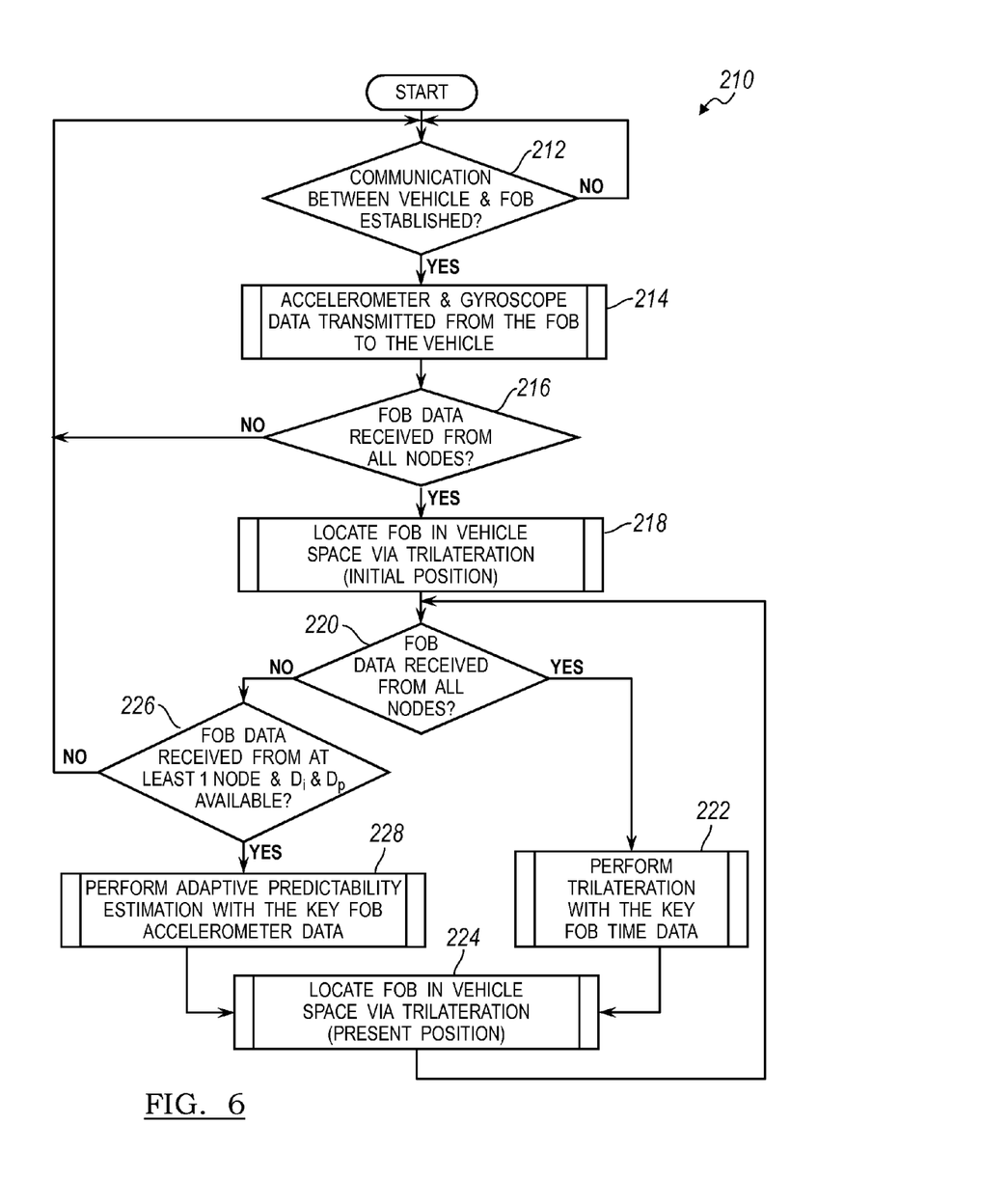
FIG. 6 depicts a method for determining the present location of the wireless device in accordance with another embodiment.

FIG. 6 illustrates a method 210 for determining the present position of the wireless device using adaptive predictability estimation based on the accelerometer data, and without any gyroscope data. The method 210 of FIG. 6 is similar to the method 110 described for FIG. 5, with the exception of the determination of the present location ($D_p$) of the wireless device.

At operation 212, the vehicle system 10 determines if communication between the wireless device and the vehicle nodes 14, 16 has been established. Operation 212 repeats until communication is established. At operation 214 each node 14, 16 receives information from the wireless device 12 including the acceleration data. Each node 14, 16 then generates a message that is indicative of the time of flight of the wireless signal 58, and the acceleration information. At operation 216, the main base station 14 determines if the data from the wireless device 12 has been received by all vehicle nodes, including itself. If the determination at operation 216 is negative, indicating a partial disruption of communication between the wireless device 12 and the nodes 14, 16, then the vehicle system 10 returns to operation 212. If the determination at operation 216 is positive, (all nodes 14, 16 received the wireless device data) then the vehicle system 10 proceeds to operation 218 and calculates a first final position of the wireless device 12, such as the initial position ($D_i$), using TOF and trilateration.

At operation 220 the vehicle system 10 again determines if the data from the wireless device 12 has been received by all vehicle nodes, including itself. If the determination at operation 220 is positive (all nodes 14, 16 received the wireless device data) then the vehicle system 10 proceeds to operations 222 and 224 calculates a present position ($D_p$) of the wireless device 12 using TOF and trilateration.

If the determination at operation 220 is negative, the vehicle system 10 proceeds to operation 226. At operation 226 the vehicle system 10 determines if data from the wireless device 12 has been received from at least one vehicle node 14, 16, and if a previously determined initial position ($D_i$) and a previously determined present position ($D_{pp}$) are available. If the determination at operation 226 is positive, then vehicle system proceeds to operation 228 and predicts a second final position of the wireless device 12 using a Kalman filter and an adaptive predictability analysis.

At operation 228 the vehicle system 10 calculates a velocity of the wireless device 12 based on a difference between the initial position ($D_i$) and the previous present position ($D_{pp}$) over time. The vehicle system then compares the distance vectors associated with each position ($\vec{D}_i$) and ($\vec{D}_{pp}$) to estimate a heading of the wireless device 12. The vehicle system then weights the velocity and heading estimations along with the Acceleration data using the Kalman filter to determine a displacement of the wireless device in each direction ($d_x$, $d_y$ and $d_z$).

The vehicle system 10 then uses an adaptive predictability estimation to analyze the likelihood that the displacement is correct, based on the accelerometer data. This information can be used to filter, bias, reject, or ignore the displacement data. For example, if the Kalman filter indicates that the wireless device 12 has moved, however the accelerometer data indicates that there was no movement, then the adaptive predictability process could bias the system toward less movement or no movement.

Then the wireless device 12 can be placed in the vehicle space at a second final position, such as the present position ($D_p$) with a heading, velocity and potential displacement relative to its velocity. After operation 224, the vehicle system returns to operation 220.

Additionally, if at any time during the method 210, at least one of the acceleration data values ($A_x$, $A_y$, and $A_z$) is equal to zero for longer than a threshold period of time (e.g., 10 seconds), then the vehicle system determines that the wireless device 12 has stopped and returns to operation 212 without determining a present position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
    a portable device configured to transmit a first wireless signal; and
    a plurality of base stations for being positioned about a vehicle, each base station being configured to receive the first wireless signal, wherein a main base station of the plurality of base stations is configured to:
        determine a first final position in response to each of the plurality of base stations successfully receiving the first wireless signal;
        monitor for subsequent receipt of a second wireless signal indicative of motion data of the portable device at each of the plurality of base stations after determining the first final position;
        determine that a first base station has received the second wireless signal;
        determine that a second base station has not successfully received the second wireless signal; and
        determine a second final position of the portable device using the first final position and the motion data of the second wireless signal as received at the first base station and after determining that the second base station has not successfully received the second wireless signal.

2. The vehicle system of claim 1 wherein each of the plurality of base stations is configured to generate a first message indicative of a time of flight of the first wireless signal in response to successfully receiving the first wireless signal.

3. The vehicle system of claim 2 wherein the main base station is further configured to:
    calculate a distance between the portable device and each of the plurality of base stations based on the first message generated by the corresponding base station;
    determine a zone in which the portable device is located within relative to the vehicle based on the distances; and
    calculate the first final position of the portable device relative to a reference vehicle location based on the distances and the zone.

4. The vehicle system of claim 1 wherein the motion data further comprises acceleration data and orientation data, wherein the portable device further comprises:
    an accelerometer configured to provide the acceleration data; and
    a gyroscope configured to provide the orientation data.

5. The vehicle system of claim 4 wherein the main base station is further configured to:
    filter the acceleration data using the orientation data after determining that the second base station has not successfully received the second wireless signal, and generate filtered acceleration data;
    calculate a velocity of the portable device based on a first integral of the filtered acceleration data;
    calculate a displacement of the portable device from the first final position based on a second integral of the filtered acceleration data; and
    determine the second final position of the portable device based on the velocity and displacement of the portable device.

6. The vehicle system of claim 4 wherein the main base station is further configured to:
    estimate a state indicative of the second final position of the portable device using a Kalman filter based on at least one of the acceleration data, the orientation data and the first final position.

7. The vehicle system of claim 1 where the main base station is further configured to:
    determine the second final position of the portable device based on the first final position and a velocity of the portable device, the velocity of the portable device being dependent on a filtered acceleration of the portable device.

8. The vehicle system of claim 1 wherein the main base station is further configured to:
    calculate the first final position of the portable device relative to a reference vehicle location based on a time of flight of the first wireless signal between the portable device and each of the plurality of base stations; and
    estimate a state indicative of the second final position of the portable device using a Kalman filter based on the motion data and the first final position.

9. The vehicle system of claim 8 wherein the main base station is further configured to:
    calculate a velocity of the portable device based on a difference between the first final position and the second final position over time;
    estimate a displacement of the portable device between the first final position and the second final position based on the velocity; and
    estimate a third final position of the portable device based on the displacement.

10. An apparatus comprising:
    a plurality of base stations for being positioned about a vehicle, each base station being configured to receive a first wireless signal from a portable wireless device, wherein a main base station of the plurality of base stations is configured to:
        determine a first final position in response to each of the plurality of base stations successfully receiving the first wireless signal;

monitor for subsequent receipt of a second wireless signal indicative of acceleration data and orientation data of the portable device at each of the plurality of base stations after determining the first final position;

determine that a first base station has received the second wireless signal;

determine that a second base station has not successfully received the second wireless signal; and determine a second final position of the portable device using the first final position, and the acceleration data and the orientation data of the second wireless signal as received at the first base station, after determining that the second base station has not successfully received the second wireless signal.

11. The apparatus of claim 10 wherein the main base station is further configured to:

filter the acceleration data using the orientation data after determining that the second base station has not successfully received the second wireless signal, and generate filtered acceleration data; and determine the second final position of the portable device based on the filtered acceleration data of the portable device.

12. The apparatus of claim 11 wherein the main base station is further configured to:

calculate a velocity of the portable device based on a first integral of the filtered acceleration data;

calculate a displacement of the portable device from the first final position based on a second integral of the filtered acceleration data; and determine the second final position of the portable device based on the velocity and the displacement of the portable device.

13. The apparatus of claim 10, wherein each of the plurality of base stations is configured to generate a first message indicative of a time of flight of the first wireless signal in response to successfully receiving the first wireless signal.

14. The apparatus of claim 13 wherein the main base station is further configured to:

calculate a distance between the portable device and each of the plurality of base stations based on the first message generated by the corresponding base station;

determine a zone in which the portable device is located within relative to the vehicle based on the distances; and calculate the first final position of the portable device relative to a reference vehicle location based on the distances and the zone.

15. The apparatus of claim 14 wherein the main base station is further configured to:

control unlocking of a vehicle door located proximate to the zone based on the second final position of the portable device.

16. A method for detecting a location of a portable device, the method comprising:

transmitting a first wireless signal to a plurality of base stations;

determining a first final position in response to each of the plurality of base stations successfully receiving the first wireless signal;

monitoring for subsequent receipt of a second wireless signal indicative of motion data of the portable device at each of the plurality of base stations after determining the first final position;

determining that a first base station has received the second wireless signal;

determining that a second base station has not successfully received the second wireless signal; and determining a second final position of the portable device using the first final position and the motion data of the second wireless signal as received at the first base station and after determining that the second base station has not successfully received the second wireless signal.

17. The method of claim 16 wherein the motion data further comprises at least one of acceleration data and orientation data.

18. The method of claim 17, further comprising:

filtering the acceleration data using the orientation data to remove gravitational effects and to orient the portable device relative to a reference vehicle location.

19. The method of claim 18 further comprising:

estimating a state indicative of the second final position of the portable device using a Kalman filter based on the acceleration data, the orientation data and the first final position.

20. The method of claim 16 further comprising:

determining the second final position of the portable device based on the first final position and a velocity of the portable device, the velocity of the portable device being dependent on a filtered acceleration of the portable device.

* * * * *